(12) United States Patent
Beall et al.

(10) Patent No.: US 6,484,165 B1
(45) Date of Patent: *Nov. 19, 2002

(54) METHOD AND SYSTEM FOR DATABASE MANIPULATION

(75) Inventors: Christopher Wade Beall, Lafayette, CO (US); Michael Renn Neal, Superior, CO (US); James Michael Wilmsen, Westminster, CO (US)

(73) Assignee: Requisite Technology, Inc., Westminster, CO (US)

(*) Notice: Subject to any disclaimer, the term of this patent is extended or adjusted under 35 U.S.C. 154(b) by 0 days.

This patent is subject to a terminal disclaimer.

(21) Appl. No.: 09/920,874

(22) Filed: Aug. 2, 2001

Related U.S. Application Data

(63) Continuation of application No. 09/514,524, filed on Feb. 28, 2000, now Pat. No. 6,321,224, which is a continuation of application No. 09/058,553, filed on Apr. 10, 1998, now Pat. No. 6,032,145.

(51) Int. Cl.$^7$ .............................................. G06F 17/30
(52) U.S. Cl. ........................................ 707/3; 707/104.1
(58) Field of Search ........................... 707/3, 4, 5, 102, 707/104.1

(56) References Cited

U.S. PATENT DOCUMENTS

| | | | |
|---|---|---|---|
| 4,879,648 A | 11/1989 | Cochran et al. | 364/300 |
| 4,947,028 A | 8/1990 | Gorog | 235/381 |
| 4,984,155 A | 1/1991 | Geier et al. | 364/401 |
| 4,992,940 A | 2/1991 | Dworkin | 364/401 |
| 5,206,949 A | 4/1993 | Cochran et al. | 707/1 |
| 5,319,542 A | 6/1994 | King, Jr. et al. | 364/401 |
| 5,630,125 A | 5/1997 | Zellweger | 395/614 |
| 5,715,444 A | 2/1998 | Danish et al. | 395/604 |
| 5,799,157 A | 8/1998 | Escallon | 395/227 |
| 5,924,090 A | 7/1999 | Krellenstein | 707/5 |
| 6,032,145 A * | 2/2000 | Beall et al. | 707/5 |
| 6,169,992 B1 | 1/2001 | Beall et al. | 707/103 |
| 6,230,154 B1 | 5/2001 | Raz et al. | 707/3 |

FOREIGN PATENT DOCUMENTS

| | | | |
|---|---|---|---|
| WO | WO 99/53421 | 10/1999 | G06F/17/30 |

* cited by examiner

*Primary Examiner*—Diane D. Mizrahi
(74) *Attorney, Agent, or Firm*—Blakely, Sokoloff, Taylor & Zafman LLP

(57) ABSTRACT

An electronic catalog requisition system includes software for efficiently selecting items from a database. The software accepts search terms from a user, and then executes a sequence of search strategies on the database which may include a proximity search, a word count search, and a fuzzy logic search. The sequence is terminated when a search algorithm has uncovered at least one match. Each database entry has a corresponding product category. A list of categories from each of the matching products is dynamically compiled and displayed to the user. The user can page through the list of displayed matches, or alternatively can create a subset of the list by selecting only the items within one of the categories. In addition, the user can further refine the list of items by selecting those items having a particular attribute. The software can also maintain a list of synonyms for attributes as an aid for finding appropriate matches within the database. Natural adjectives to certain of the attributes are recognized as further refinements to the search criteria. The invention has the advantage that users with a wide range of skills and/or familiarity with products can quickly find the products that they need. The software has the additional feature of creating electronic requisitions for the products listed in the database.

29 Claims, 6 Drawing Sheets

FIG. 3

Schwab Product Search http://209.38.52.203/servlet/ReqCo...uicksearch=bic+pen+red&tableview=T

Schwab Product Search  300

```
bic pen red
```
Search string may include category, part number, manufacturer, description
☐ Include priced products only   ◉ Table display   ○ Web-style display 304 {
● Show all categories with *bic pen red* or click a category below
○ Pens   ○ Pen Refills
}

306

[View Cart]

310  1-10 of 29 Items Matching Search

| Category | Mfr Name | Mfr Part # | | Description |
|---|---|---|---|---|
| Pens | Bic Corp | SGSF-RED FINE | Add to Cart | PEN BALLPOINT SGSF-RED FINE SOFTFEEL W/CLIP AND |
| Pens | Bic Corp | REMBID RED | Add to Cart | PEN, MICRO ROLLER,X-FNE,RD |
| Pens | Bic Corp | SCSM11-RED | Add to Cart | PEN,BALL PT,RTRBL,MED,RED |
| Pens | Bic Corp | SCSF11-RED | Add to Cart | PEN,BALL PT,RTRBL,FN,RED |
| Pens | Bic Corp | 20118 | Add to Cart | PEN BALLPOINT GSM11 RED MED BIRO W/CAP & CLIP |
| Pens | Bic Corp | 20128 | Add to Cart | PEN BALLPOINT GSF11 RED FN BIRO W/CAP & CLIP |
| Pens | Bic Corp | 10128 | Add to Cart | PEN BALLPOINT MS11 RED MED W/CAP & CLIP |
| Pens | Bic Corp | MRC21RD | Add to Cart | REFILL,PEN,BALL,MED,RED |
| Pen Refills | Bic Corp | MS11RED | Add to Cart | PEN,BALL,STIC,MED,RED |
| Pen Refills | Bic Corp | MRM21RD | Add to Cart | REFILL,F/4COLOR PEN,MED,RED |

302

[Next ▶]  308

Schwab Product Search    http://209.38.52.203/servlet/ReqCo...18144&query=RefineSearch&pagenum=2

Schwab Product Search bic pen red    [SEARCH]  [HINTS]

Search string may include category, part number, manufacturer, description
☐ Include priced products only   ⦿ Table display   ○ Web-style display ○ Show all categories with *bic pen red* or click a category below
⦿ Pens   ○ Pen Refills 1-10 of 29 Items Matching Search    [View Cart]

| Category | Mfr Name | Mfr Part # | | Description | Point Type |
|---|---|---|---|---|---|
| Pens | Bic Corp | SCSMII-RED | Add to Cart | PEN BALL PT,RTRBL,MED,RED | -- |
| Pens | Bic Corp | SGSF-RED FIND | Add to Cart | PEN BALLPOINT SGSF-RED FINE SOFTFEEL W/CLIP AND | -- |
| Pens | Bic Corp | REMBID RED | Add to Cart | PEN, MICRO ROLLER,X-FNE,RD | -- |
| Pens | Bic Corp | SCSF11-RED | Add to Cart | PEN,BALL PT,RTRBL,FN,RED | -- |
| Pens | Bic Corp | 10128 | Add to Cart | PEN BALLPOINT MS11 RED MED W/CAP & CLIP | -- |
| Pens | Bic Corp | 20128 | Add to Cart | PEN BALLPOINT GSF11 RED FIN BIRO W/CAP & CLIP | -- |
| Pens | Bic Corp | 20118 | Add to Cart | PEN BALLPOINT GSM11 RED MED BIRO W/CAP & CLIP | -- |
| Pens | Bic Corp | MS11RED | Add to Cart | PEN,BALL,STIC,MED,RED | -- |
| Pens | Bic Corp | 13103 | Add to Cart | PEN,MED,BALLPT,RD,SFTFEL | Ball Point |
| Pens | Bic Corp | 13102 | Add to Cart | PEN,MED,BALLPT,BK,SFTFEL | Ball Point |

402

[NEXT ▶]

FIG. 4

METHOD AND SYSTEM FOR DATABASE MANIPULATION

CROSS-REFERENCE TO RELATED APPLICATIONS

This application is a continuation of prior application Ser. No. 09/514,524, filed on Feb. 28, 2000, now U.S. Pat. No. 6,321,224 which is a continuation of prior application Ser. No. 09/058,553, filed on Apr. 10, 1998 and issued Feb. 29, 2000 as U.S. Pat. No. 6,032,145.

FIELD OF THE INVENTION

The present invention relates to software for database interrogation and manipulation and, more particularly, to a method and system for retrieving database records using predefined classifications, and further coupled with search refinement options based on parametrics and classification.

BACKGROUND OF THE INVENTION

Searchable electronic catalogs are commonly used in support of various electronic commerce and purchasing functions. These catalogs must have a user interface for selectively retrieving data records. Software engineers desire to make the user interfaces as simple as possible to operate, because complexity of the user interface can be a detriment to sales from the catalog. Simplicity becomes particularly important when the catalog is intended to be accessed by users with varying levels of skill or training.

User interfaces that are simple to operate should have the capability to handle almost any type of user input. In the case of an electronic catalog, if the user knows the exact part number of the desired product and enters the part number correctly into the user interface, then the database search engine will quickly identify the desired record from the database based on an exact match with the search string. In a more general case, the user may have only partial information about the desired product, or may incorrectly type the search string.

Danish et al. in U.S. Pat. No. 5,715,444 disclose a process for identifying a single item from a family of items in a database. A feature screen and search process present the user with a guided nonhierarchical parametric search to identify matching items based upon user specified criteria and priorities. Also disclosed are a method and system appropriate in an Internet environment.

Cochran et al. in U.S. Pat. Nos. 4,879,648 and 5,206,949 disclose a method of variably displaying search terms in which two control inputs are used to select a plurality of terms for a plurality of categories. A term in a visible position on the screen becomes a search term or a qualifier for other records in the database. The search results are dynamically formed on the basis of selected search terms. The search results can also be grouped in fixed or static lists.

Blutinger et al. in U.S. Pat. No. 5,231,566 disclose a method and apparatus for producing a catalog. The catalog has the characteristic that all like items in the database have the same catalog item number, whereas different items have different catalog item numbers.

Geier et al. in U.S. Pat. No. 4,984,155 disclose a system for enabling a customer to operate a data terminal for placing an order for goods or services. The customer is permitted to enter an invalid catalog number that is used as a key to display a series of products having catalog numbers similar to the catalog number entered by the customer.

Prior catalog search algorithms typically employ one of two search strategies. The first strategy is a keyword search for selecting database records based on matching text strings. The second strategy is a hierarchical search for selecting database records based on lists of classifications from which to narrow and select the database records. Each of the two search strategies has disadvantages that can make it difficult for users to find their desired database records.

The keyword search strategy has the disadvantage that users must be familiar with the appropriate key word terms that are likely to yield the desired data records. In addition, it is not always possible to quickly collect groups of logically related data records. If a close match is found, but it is not the desired exact match, it is not always possible to utilize the information in the close match to quickly identify all similar data records. A keyword search engine does not typically have a "more-like-this" function that operates on close matches to identify similar items within the database.

The hierarchical search strategy can take advantage of a logical grouping of data records. This search strategy is best suited for finding data that break down logically into successively greater levels of detail. This search strategy is most effective when the data have been carefully edited and structured within a database. Finding a single relevant record can quickly lead to all other relevant records, as long as the grouping logic relates to the way in which the data are used.

Thus, a "more-like-this" function can quickly identify all similarly classified records in the database.

The disadvantage of the hierarchical search strategy is that users may not always anticipate the proper classification of certain records, and may search the wrong categories for their desired database record. The user is tied to the logical structure of the data, and must learn to navigate the predefined structure of the database in order to locate particular data records.

It would be desirable to allow free-form text searching, with no prerequisites for format or content. Thus, it would be desirable to have a system capable of identifying the database records most likely to be the desired choice of the user, even when the user inputs a search string having misspelled terms, word fragments, or other characteristics of the item being sought. It would further be desirable to take advantage of natural relationships and logical groupings within the data records to compile lists of similarly classified data records. The prior art has not disclosed a system that provides a simple and convenient user interface coupled with a search engine that has the architecture and advantages of the present invention.

SUMMARY OF THE INVENTION

The present invention provides a simple user interface that combines the ease of keyword searching with the advantages of search refinement through classification or parametric selections. The text searching is improved through the use of sequential search algorithms that are designed to maximize the chances of identifying the desired data records. The search refinement is presented as a simple selection from a list of classifications that is dynamically compiled based on the results of the keyword search. The output to the user reports on both generic and category-specific product characteristics.

According to the present invention, a method of selecting data records in a catalog database comprises the following steps: inputting search terms to a user interface; testing the search terms against the catalog using a sequence of search algorithms, wherein each search algorithm is applied against the database to identify matching catalog records comprising a set; terminating the sequence of search algorithms when at least one record becomes a member of the set; compiling a unique list of classifications from each member of the set, said list comprising at least a first classification; displaying at least a portion of the set along with the list of classifications; creating a subset of the set by selecting members having the first classification; and displaying the subset.

The invention comprises a database along with a search engine. The database typically consists of category descriptions, manufacturer's name, manufacturer part number, short text description, and parametrically composed descriptions. Product categories and characteristics are represented directly by tables and columns respectively.

The search engine executes a series of text string matching algorithms, in sequence, until at least one match is identified from the catalog. The sequence comprises proximity searching, string matching, stemming, fuzz logic, and soundex matching. For example, if an exact match is found, the search halts when all exact matches have been identified, and there is no further recourse to other search algorithms. If no exact match is found, then the search terms are manipulated to identify strings with similar roots. If, again, no match is found, the search terms are tested further according to other algorithms, such as fuzzy logic and soundex, until a match is found or the search engine reaches its logical termination.

One of the important aspects of the search strategy is that the searchable terms include the predefined classification terms as well other attributes and parameters of each catalog entry. This means that the freeform text input will show text string matches against any classification name or parametric name. This feature enhances the possibility of finding the desired data record based on the keyword search engine.

Each catalog entry has an associated classification according to type, and a list of unified classifications is compiled dynamically from the identified matches. Dynamic compilation refers to the process of continuously updating the list of classifications whenever new matches are identified. This insures that the list continuously and accurately reflects the range of classifications of the identified matches. The list is unified in the sense that each classification is listed only once, even when the identified matches have multiple records with the same classification. The classification list is presented to the user along with the list of matches as an aid to the user for further refining the search methodology.

Those skilled in the art will recognize the benefits and objects of this invention, which include but are not limited to the following: providing a database search engine that can quickly and easily lead users to a desired database record; combining the benefits of key word searching with the benefits of hierarchical searching; providing an interface that will process any type of user entry, including misspelled words and word fragments; displaying a list of product categories that can be used to narrow the database search criteria; providing a search engine and database structure that maximizes the likelihood of finding the desired database records based on a simple user interface.

BRIEF DESCRIPTION OF THE DRAWINGS

The subject matter which is regarded as the invention, together with further objects and advantages thereof, may best be understood by reference to the description herein, taken in conjunction with the accompanying drawings, in which:

FIG. 3 is a representative display of the results of a search at the user interface.

FIG. 4 is a representative display of the results shown in FIG. 3, and further narrowed by, selection of a single classification from the user interface.

DETAILED DESCRIPTION OF THE INVENTION

Figure 1:
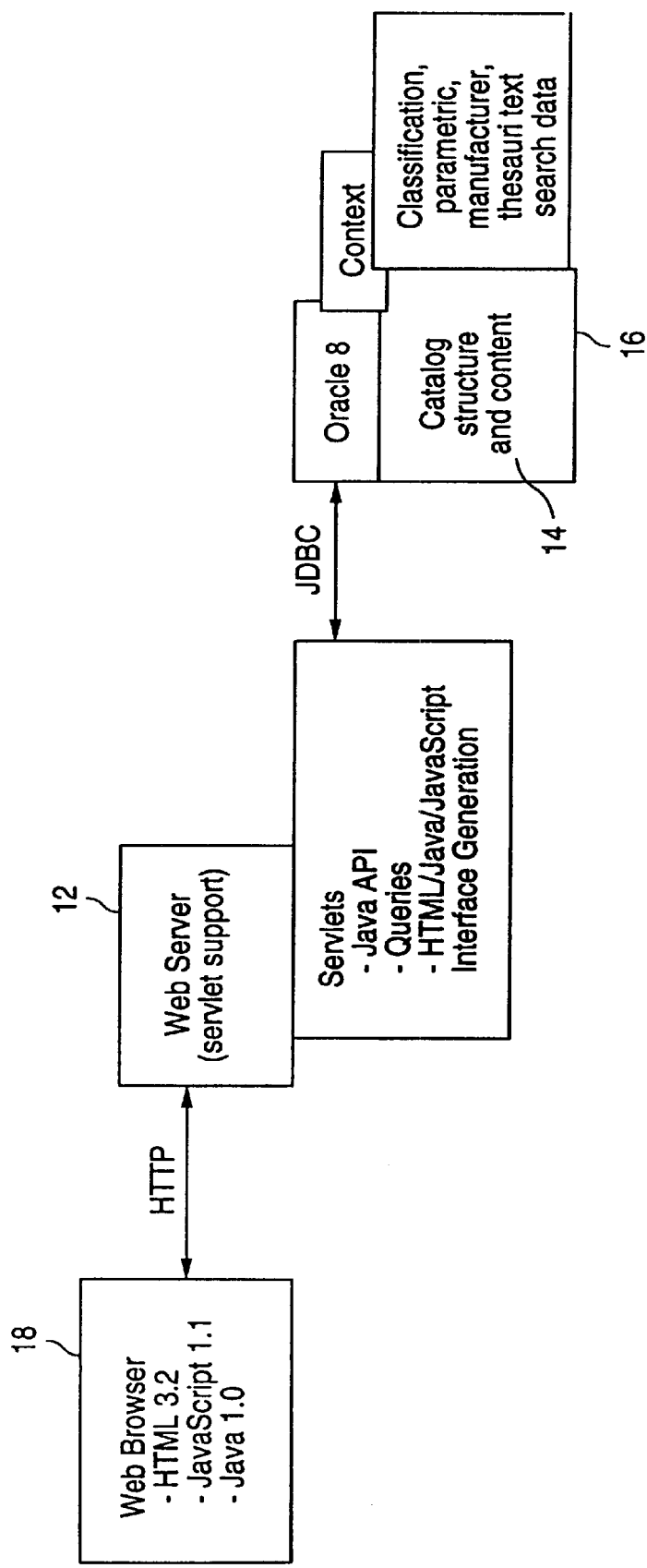
FIG. 1 is a block diagram representation of an electronic catalog requisition system employing the present invention.

FIG. 1 is a functional block diagram representation of an electronic catalog and automated purchase requisition system. An application server 12 is connected to interact with a database 14 which resides in a computer memory storage device 16. Users of the system have workstations 18 that are connected to the application server 12 through a wide area network such as the Internet. Commands entered into web browser software cause information to be extracted from the database 14 and displayed at the workstation 18.

The database 14 is an electronic catalog of products. The database 14 is preferably constructed in a manner known as a "universal" catalog, in which like products from different suppliers have a single database record. Constructing a universal catalog typically requires an editor to ensure that each unique product has a unique database record. This database architecture has the advantage that users will be able to recognize identical products from different suppliers. In contrast to a universal catalog, an aggregated catalog is merely an aggregate of product information from multiple suppliers. The same item may be listed several times in an aggregated catalog, though not usually in a consistent manner, with the undesirable result that users may not recognize that different database records actually refer to the same product.

In one embodiment of the invention, the software 10 is configured to access one of several electronic catalogs. The selection of a catalog is based on the likelihood that the catalog will have the desired item. As such, there must be a standard query format for each of the catalogs so that the same search string can be used to determine possible matches against each catalog. The match results can then be used by the software 10 to select among the catalogs. The type or format of the catalog is irrelevant as long as the catalog will respond appropriately to a text query from the software 10. For example, the catalog may reside within a relational database or may reside within an object-oriented database.

Referring back to FIG. 1, the storage device 16 may be a disk drive, a tape drive RAM, or any of the known computer data storage devices. The application server 12 may reside in a computer attached directly to the storage device 16, or alternatively may be connected to the storage device 16 through a network. In each case, the application server 12 queries the database 14 and directs the results to the workstation 18.

Software 10 is executed within the application server 12. The software 10 follows an algorithm as shown in the logic block diagram of FIG. 2. The user inputs a search string, as shown in block 100. The search string is free-form, meaning that the string may be any combination of alphanumeric characters or search terms. No particular syntax is required for the search string. The search string may comprise search terms in any order. For example, the search string could include the name of an item, a part number for an item, or any descriptive attribute of the item.

The software 10 is designed to handle misspellings, word fragments, or any other string that may lead a user to find the desired product within the database 14.

The software 10 preferably has a single text box for search strings, shown as box 300 of FIG. 3. The example search string in box 300 is "bic pen red" which represents a combination of manufacturer name, classification, and attribute. It has been found that users desire the simplicity of typing strings at a single location, without differentiating whether the string represents a product name, a product manufacturer, or a product attribute. Alternatively, there may be separate text boxes for different types of search strings.

The software 10 performs a proximity query which will try to find an exact match of the search string within the database 14. Each record within the database is tested against the search string to find records that contain all of the search terms in proximity to each other. The highest quality match will be a record in which all terms appear in the same order as the search string. A lower quality match will have the terms in a different order, or may have the terms separated by other strings. The proximity query is a well-known procedure in the art of computer science, and certain commercial databases offer a proximity query function. An example of a database software package having the aforementioned function is Oracle 8 and the associated context cartridge, supplied by Oracle Corporation of El Segundo, Calif.

At the conclusion of the proximity query, the software 10 checks to see if any matches were found, as shown in block 102. An exact match will lead the software to test whether price and vendor information need to be provided to the user, as shown in block 112. If no exact match is found, the software 10 sequences to the next type of search strategy.

Figure 2A:
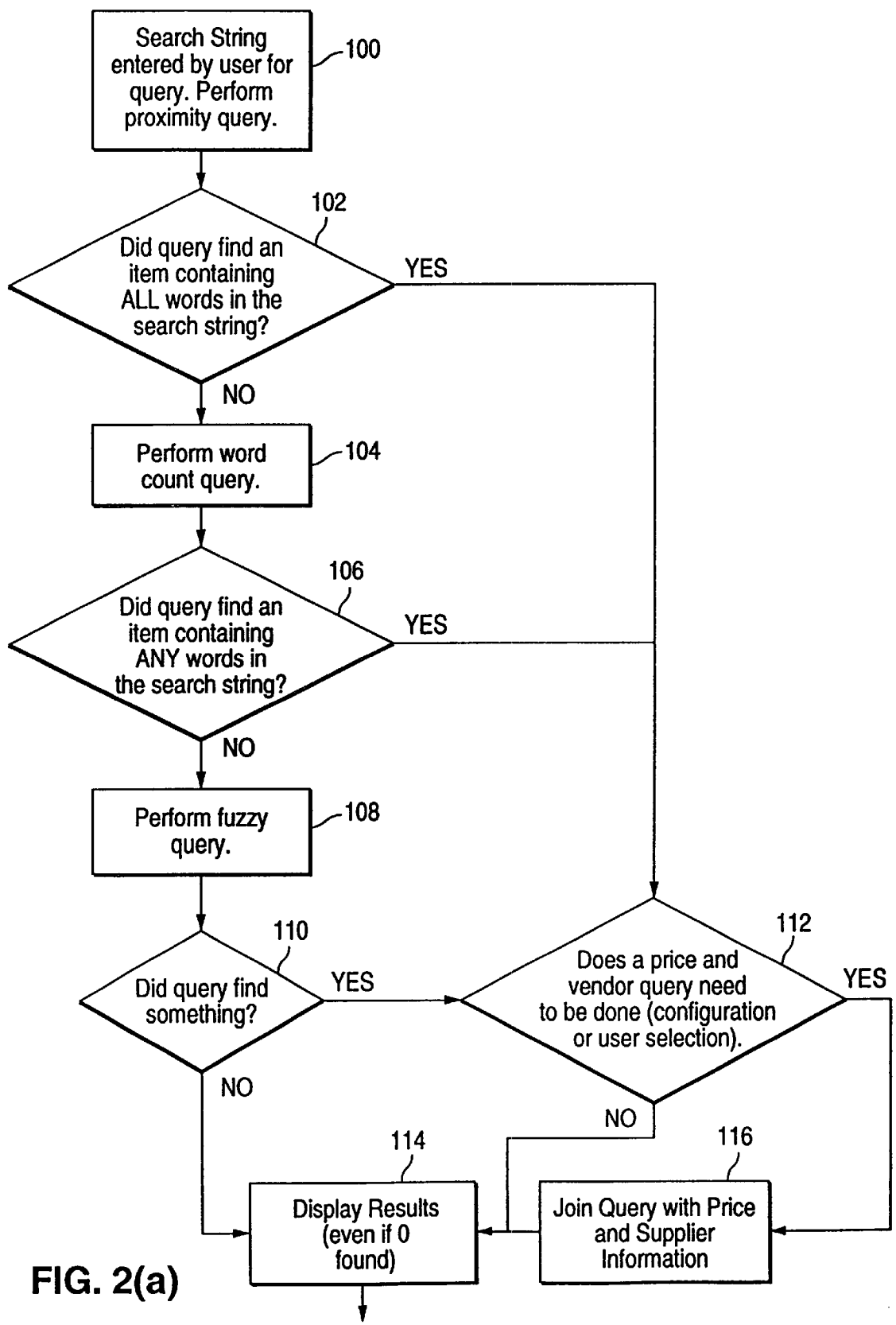
FIG. 2a is a logic diagram of a search engine according to the present invention.

Block 104 in FIG. 2a shows the preferred second sequential search algorithm. Since no exact match has been found, the software performs a word count query in which individual words or search terms within the search string are checked against the products in the database 14. The strategy at this point to find products within the database 14 that may match some of the descriptive terms in the search string. The word count query may also apply a stemming function to search terms to identify similar root words.

Block 106 test the results of the word count query to determine if any matches have been identified. If at least one item from the database 14 has been returned by the search algorithm, the software 10 proceeds to block 112. Otherwise, the software 10 executes the next algorithm in the sequence of search algorithms.

As shown in block 108, the next search algorithm in the sequence is preferably a fuzzy logic query. In this context, a fuzz logic algorithm may also be known in the art as a "word wheel" or other name associated with an algorithm for testing combinations and permutations of the alphanumeric characters in the search string. The intent in block 108 is to identify products in the database 14 having any descriptive similarity to the search string. For example, a user who enters a search string having a typographical error will not generally find an exact match within the database 14, but a fuzzy logic algorithm may select the desired product on the basis of similarity with the search string.

The software 10 may also rank the degree of similarity between each matched database record with the search string. For example, records with a larger number of alphanumeric character matches against the search term will be ranked higher than records with only a few matching characters. Ranking algorithms are found in several commercially available software packages including Oracle 8.

There are other possible sequences of search algorithms, but in general it is desirable to execute the narrowest, or most specific, search first. The sequence should proceed with search algorithms according to the scope of each algorithm. For example, a search for the specific search string is the narrowest in scope, whereas a search for related search strings will be broader in scope because it will likely return a wider range of matches.

An additional type of search algorithm not specifically shown in FIG. 2a is a "soundex" or "sounds-like" search, in which the search string is tested against database records for similarity in sound.

If any match is found as a result of a search algorithm, the successive search algorithms will be skipped and the software 10 will proceed to display the results. If the software 10 has been configured to add price and vendor information, that will also be added to the display as shown in block 116. In the unlikely event that no matches were found after completion of the entire sequence of search algorithms, the software 10 will proceed to the display block 114 with a message indicating that no products were found.

The display will have several areas of information, as shown in FIG. 3. The search string is shown in a text box 300, preferably located in the upper-left corner of the display. The list of matching items is shown in a display list 302. The display list 3702 includes the category, the manufacturer name, the manufacturer part number, and descriptive attributes.

A compilation of each unique category of product, compiled from the list of the matching items, is shown in a category display area 304. If several different categories of products were found during the search, then each category will be displayed along with a corresponding radio button 306.

Figure 2B:
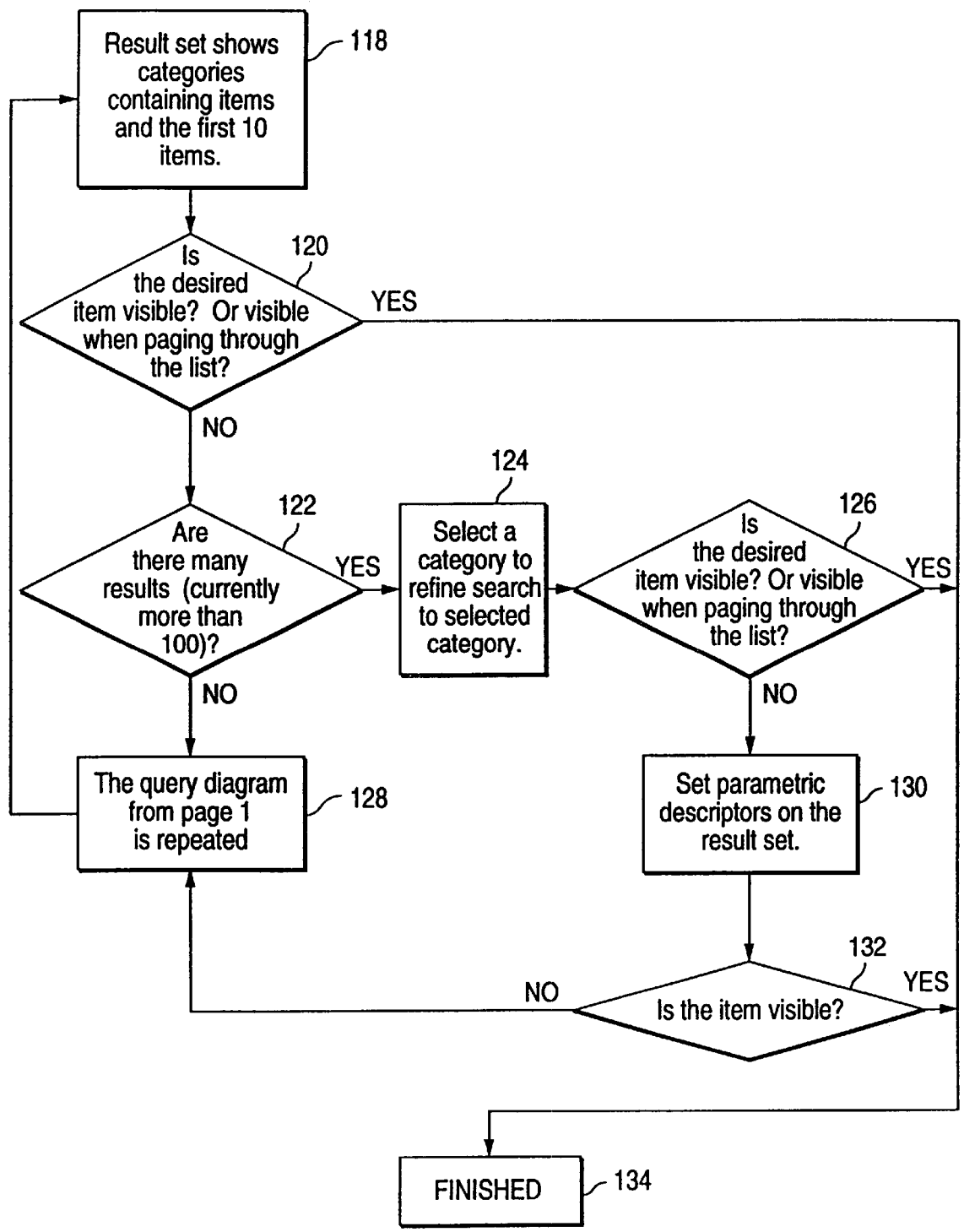
FIG. 2b is a display and refinement of search query results.

Returning to the logic of the software 10, FIG. 3 is representative of the logic contained in block 118 of FIG. 2b. If the desired item from the catalog is not immediately visible in the display, the user has the option of paging through the remaining items in the list by clicking on button 308 in FIG. 3, which is shown as logic block 120 in FIG. 2b. If the desired item is found, no further searching is required, and the logic of the algorithm drops to block 134.

As an alternative to paging though a lengthy list of products, the user can narrow the list by selecting one of the categories. For example, FIG. 3 shows that two different categories of items were found: pens and pea refills. Since there are 29 matching items (only the first 10 are shown), the selection of radio button 306 will narrow the list to include only pens and not pen refills. A new display will be generated, shown in FIG. 4, wherein the updated display list 402 has 27 items which do not include pen refills. In this embodiment, selecting a category will be restrictive in terms of the items in the display list 302. This procedure is shown as logic block 124 in FIG. 2b.

In an alternative embodiment of the invention, selecting a category will generate a new display list 302 containing every item in the catalog associated with the selected category. In this alternative embodiment, selecting a display list may be expansive in terms of the number of items shown on the display list 302.

A further alternative is to select only items having a particular manufacturer. For example, FIG. 3 has a button 310 which invokes a screen containing a list of all manufacturers of the products shown in the display list 302. Selecting one of the manufacturers will cause the software 10 to narrow the display list 302 to include only items from the selected manufacturer.

In general, items within the catalog will have parameters that can be selected to restrict the display list 302. For example, a parameter for pens may be "ink color" and has values of blue, black, or red. In the event that pens are selected as a category, the display list 302 may be further restricted to pens of a single color. This process is referred to herein as parametric refinement.

In the preferred embodiment of the invention, the algorithm will have a list of synonyms for each attribute. The search algorithms can replace individual search terms with appropriate synonyms for purposes of matching data records. The attributes are normally used as part of an algorithm for finding matches, and the use of synonyms for the attributes gives additional flexibility to the range of search strings that will produce meaningful matches.

Another way to increase the flexibility of the search algorithms is to allow natural adjectives in the search string to help select certain attributes. For example, if there is a category for computers, and the category has an attribute for processor speed, then the adjective "fastest" in the search string could be used to select the fastest computer. Slower computers would be eliminated from the display list 302.

Yet another way to increase the flexibility of the search algorithms is to assign categories alternative roles such as, but not limited to, problem spaces and applications. In this embodiment, the items found by the query are actually predefined queries that generate lists of actual data records from the database. Thus, selecting a category becomes equivalent to submitting a predefined query to the database.

If the search did not reveal the desired products from the database 14 within the list, the user is prompted to try a new search string, as shown in block 128 of FIG. 2b. Alternatively, the user may select an item, and a predefined query within the database record for that item will be input to the software 10 as a new search string, resulting in a new and updated list of categories being displayed to the user.

Figure 5:
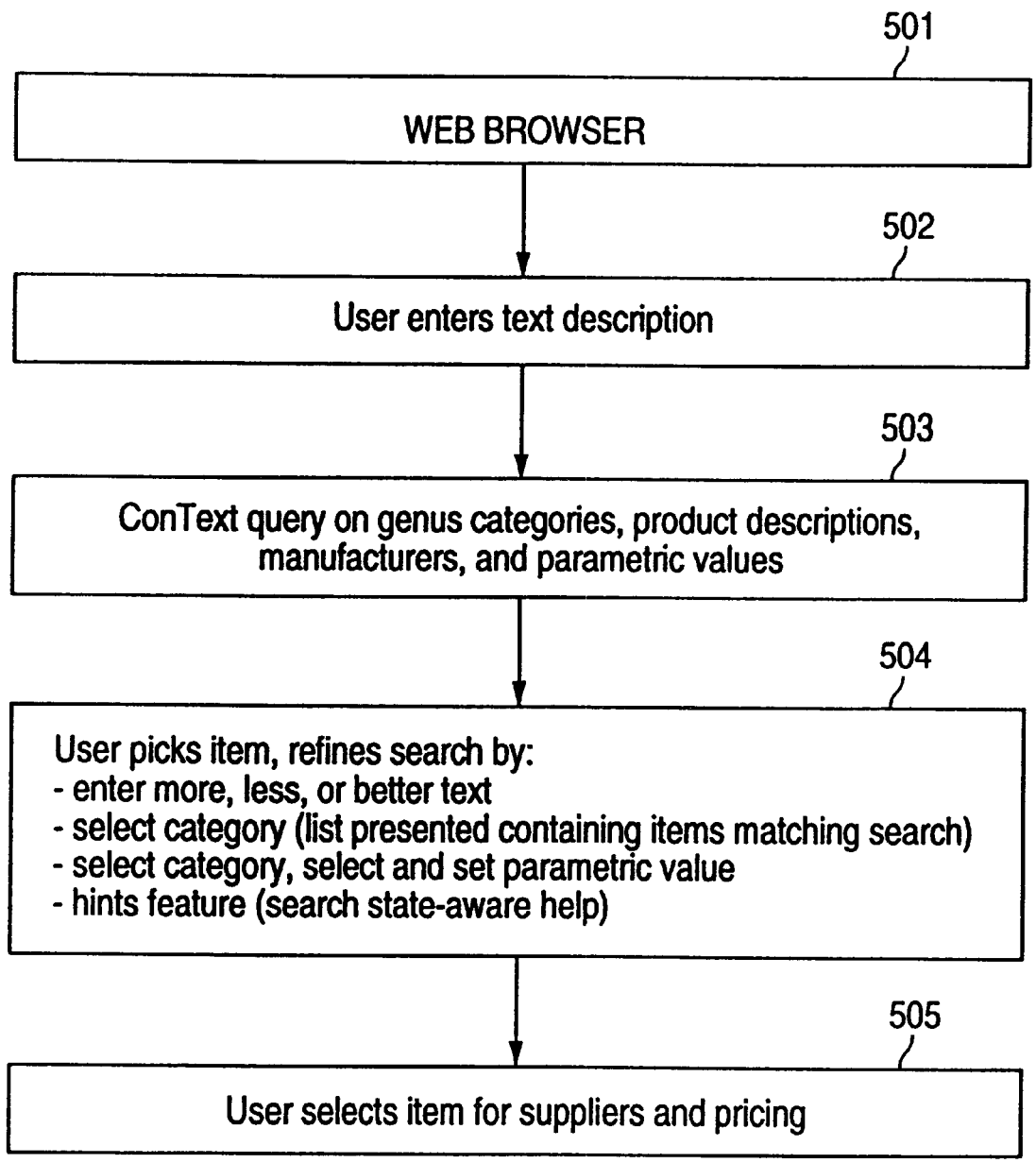
FIG. 5 is another block diagram representation of an electronic catalog requisition system employing the present invention.

FIG. 5 is an alternative simplified diagram that explains the logic of the software 10. Block 501 is representative of web-browser software that executes on a user's local computer. The text box, such as shown as 300 in FIG. 3, is presented to the user. The user enters the text description, as shown logically by block 502. The sequence of search algorithms is performed on the text description, as shown logically by block 503. The user picks an item for a display list, such as the list shown as 302 in FIG. 3. The user further refines the search with one of several options as shown in logical block 504 in FIG. 5. The user may enter more text, less text, or better (more descriptive) text and thereby generate a new display list 302. Alternatively, the user may select a category, and further may select a parametric value (also called an attribute). Once a desired item is identified, the user is presented with supplier and pricing information, as shown in logical block 505.

The electronic requisition system can provide links to further information about items within the database. The further information can be stored within the database 14, or alternatively may be stored at a remote computer accessible through the Internet. For example, buttons on the display screen can invoke links to web sites that contain relevant information.

Items within the catalog are preferably cross-referenced so that related items can be quickly located. For example, if the user selects a printer from the catalog, the appropriate toner cartridge can be immediately located by pressing a button on the display list.

Once a user identifies the desired product from the database 14, the software 10 can generate a purchase requisition having preformatted price, vendor, and user information. Individual contract terms and pricing information can be accessed by the software 10 to be reflected in the requisition. The requisition can be sent electronically to the vendor for processing.

It will be apparent to those of skill in the appertaining arts that various modifications can be made within the scope of the above invention. Accordingly, this invention is not to be considered limited to the specific examples chosen for purposes of disclosure, but rather to cover all changes and modifications which do not constitute departures from the permissible scope of the present invention. Having thus described our invention, what is desired to be secured and covered by Letters Patent is presented in the appended claims.

What is claimed is:

1. A method of selecting data records in a database, each data record having a predefined classification, the method comprising:

inputting a search string, comprising at least one search term, to a user interface;

testing the search string against the data records using a search algorithm to identify matching data records, the identified matching data records comprising a set;

compiling a list of the predefined classifications from members of the set, said list comprising at least a first classification;

displaying, at the user interface, at least a portion of the set along with the list of predefined classifications;

selecting, at the user interface, data records having the first classification, the selected data records comprising a second set having only data records that have the first classification; and displaying, at the user interface, at least a portion of the second set.

2. The method of claim 1 wherein compiling a list comprises continuously updating the list of the predefined classifications as new data records are identified.

3. The method of claim 1 wherein the list of the predefined classifications is unified so that each predefined classification is listed once even when there are multiple identified data records having the same predefined classification.

4. The method of claim 1, wherein selecting data records having the first classification comprises selecting all data records having the first classification so that the second set contains more data records having the first classification than the first set.

5. The method of claim 1, wherein selecting data records having the first classification comprises selecting only members of the set having the first classification so that the second set is a subset of the first set.

6. The method of claim 1, wherein testing the search string includes testing the search string against the predefined classifications.

7. The method of claim 6, wherein each data record has associated attributes and wherein testing the search string comprises testing the search string against the associated attributes and the predefined classifications.

8. The method of claim 1, wherein each data record has associated attributes, and further comprising:

selecting, at the user interface, at least a first attribute;

selecting at least a first value of the first attribute; and refining the set of identified data records to include only members having at least the first value of the first attribute; and displaying, at the user interface, the refined set of identified data records.

9. The method of claim 1, further comprising creating a subset of the set by selecting members having a second classification and displaying data records of the subset.

10. An apparatus for selecting data records in a database, each data record having a predefined classification, the method comprising:

means for inputting a search string, the search string comprising at least one search term, to a user interface;

means for testing the search string against the data records using a search algorithm to identify matching data records, the identified matching data records comprising a set;

means for compiling a list of the predefined classifications from members of the set, said list comprising at least a first classification;

means for displaying, at the user interface, at least a portion of the set along with the list of predefined classifications;

means for selecting data records having the first classification, the selected data records comprising a second set having only data records that have the first classification; and means for displaying, at the user interface, at least a portion of the second set.

11. The apparatus of claim 10 wherein the means for compiling a list comprises means for continuously updating the list of the predefined classifications as new data records are identified.

12. The apparatus of claim 10 wherein the list of the predefined classifications is unified so that each predefined classification is listed once even when there are multiple identified data records having the same predefined classification.

13. The apparatus of claim 10, wherein the means for selecting data records having the first classification comprises means for selecting all data records having the first classification so that the second set contains more data records having the first classification than the first set.

14. The apparatus of claim 10, wherein the means for testing the search string includes means for testing the search string against the predefined classifications.

15. The apparatus of claim 14, wherein each data record has associated attributes and wherein the means for testing the search string comprises means for testing the search string against the associated attributes and the predefined classifications.

16. The apparatus of claim 10, wherein each data record has associated attributes, the apparatus further comprising:

means for selecting at least a first attribute;

means for selecting at least a first value of the first attribute; and means for refining the set of identified data records to include only members having at least the first value of the first attribute.

17. A machine-readable medium having stored thereon data representing sequences of instructions which, when executed by a machine, cause the machine to perform operations comprising:

inputting a search string, comprising at least one search term, to a user interface;

testing the search string against data records in a database using a search algorithm to identify matching data records, each data record having a predefined classification, the identified matching data records comprising a set;

compiling a list of the predefined classifications from members of the set, said list comprising at least a first classification;

displaying, at the user interface, at least a portion of the set along with the list of predefined classifications;

selecting, at the user interface, data records having the first classification, the selected data records comprising a second set having only data records that have the first classification; and displaying, at the user interface, at least a portion of the second set.

18. The medium of claim 17 wherein compiling a list comprises continuously updating the list of the predefined classifications as new data records are identified.

19. The medium of claim 17 wherein the list of the predefined classifications is unified so that each predefined classification is listed once even when there are multiple identified data records having the same predefined classification.

20. The medium of claim 17, wherein selecting data records having the first classification comprises selecting all data records having the first classification so that the second set contains more data records having the first classification than the first set.

21. The medium of claim 17, wherein testing the search string includes testing the search string against the predefined classifications.

22. The medium of claim 17, wherein the instructions, when executed by the machine, cause the machine to perform further operations comprising creating a subset of the set by selecting members having a second classification and displaying data records of the subset.

23. An apparatus comprising:

a workstation operable to receive a search string, the search string comprising at least one search term;

a database having a plurality of data records, each data record having a predefined classification;

a server coupled to the database and the workstation operable to test the search string against the data records using a search algorithm to identify matching data records, the identified matching data records comprising a set, to compile a list of the predefined classifications from members of the set, said list comprising at least a first classification; and a display at the workstation operable to display at least a portion of the set along with the list of predefined classifications;

wherein the server is further operable to select data records having the first classification, the selected data records comprising a second set having only data records that have the first classification and the display is further operable to display at least a portion of the second set.

24. The apparatus of claim 23 wherein compiling a list comprises continuously updating the list of the predefined classifications as new data records are identified.

25. The apparatus of claim 23 wherein the list of the predefined classifications is unified so that each predefined classification is listed once even when there are multiple identified data records having the same predefined classification.

26. The apparatus of claim 23, wherein selecting data records having the first classification comprises selecting all data records having the first classification so that the second set contains more data records having the first classification than the first set.

27. The apparatus of claim 23, wherein testing the search string includes testing the search string against the predefined classifications.

28. The apparatus of claim 27, wherein each data record has associated attributes and wherein testing the search string comprises testing the search string against the associated attributes and the predefined classifications.

29. The method of claim 28 wherein testing the search string comprises testing the search string against all associated attributes and all predefined classifications.

* * * * *